United States Patent
Thomas et al.

(10) Patent No.: US 7,576,683 B2
(45) Date of Patent: Aug. 18, 2009

(54) METHODS AND SYSTEMS FOR REDUCING INTERFERENCE CAUSED BY ANTENNA LEAKAGE SIGNALS

(75) Inventors: Steven H. Thomas, Brooklyn Center, MN (US); Glen B. Backes, Maple Grove, MN (US); Timothy J. Reilly, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/462,907

(22) Filed: Aug. 7, 2006

(65) Prior Publication Data

US 2009/0096663 A1    Apr. 16, 2009

(51) Int. Cl.
  G01S 13/94  (2006.01)
  G01S 13/10  (2006.01)
  G01S 7/34   (2006.01)
  G01S 7/28   (2006.01)

(52) U.S. Cl. ............................ 342/120; 342/82; 342/85; 342/89; 342/91; 342/137; 342/159; 342/205

(58) Field of Classification Search ......... 342/120–122, 342/205, 82–87, 89–92, 123, 137, 131–132, 342/134–144, 201–204, 159, 175
See application file for complete search history.

(56) References Cited

U.S. PATENT DOCUMENTS

| | | | |
|---|---|---|---|
| 2,655,651 A | 10/1953 | Allen et al. | |
| 2,738,503 A * | 3/1956 | Allen | 342/92 |
| 3,659,290 A * | 4/1972 | Bourque | 342/136 |
| 4,023,168 A | 5/1977 | Bruder et al. | |
| 4,169,263 A * | 9/1979 | Hooker, Jr. | 342/92 |
| 4,213,126 A * | 7/1980 | Mulder et al. | 342/36 |
| 4,370,652 A * | 1/1983 | Lucchi | 342/101 |
| 4,698,636 A | 10/1987 | Marlow et al. | |
| 4,733,239 A | 3/1988 | Schmitt | |
| 5,047,775 A | 9/1991 | Alitz | |
| 6,362,776 B1 | 3/2002 | Hager et al. | |
| 7,075,478 B2 * | 7/2006 | Hager et al. | 342/120 |
| 2004/0239559 A1 | 12/2004 | King et al. | |
| 2005/0231710 A1 | 10/2005 | Jamieson et al. | |
| 2005/0270226 A1 | 12/2005 | Hager et al. | |
| 2006/0066473 A1 | 3/2006 | Yokoyama et al. | |

* cited by examiner

Primary Examiner—Thomas H Tarcza
Assistant Examiner—Cassi Galt
(74) Attorney, Agent, or Firm—Fogg & Powers LLC

(57) ABSTRACT

In one aspect, a method of radar altimeter operation including a time dependent gain control is described. The method comprises triggering a Sensitivity Time Control (STC) gain control signal at a pulse repetition frequency (PRF) of a transmit pulse to attenuate interference from at least one of an antenna leakage signal and a signal reflected from equipment. The method also includes shaping the STC gain control signal from no attenuation at a first time, before a transmitter sends the transmit pulse, to a stable maximum attenuation at the time the transmitter sends the transmit pulse, to no attenuation at a second time, after the transmitter sends the transmit pulse. The method also includes matching a bandwidth of an intermediate frequency (IF) amplifier to the pulse width of a transmitted pulse.

15 Claims, 5 Drawing Sheets

METHODS AND SYSTEMS FOR REDUCING INTERFERENCE CAUSED BY ANTENNA LEAKAGE SIGNALS

BACKGROUND OF THE INVENTION

This invention relates generally to radar altimeters, and more specifically, to methods and systems that reduce interference caused by at least one of an antenna leakage signal and a signal reflected from other equipment mounted on an air vehicle.

A radar altimeter typically includes a transmitter for applying pulses of electromagnetic energy, at a radio frequency (RF), and at regular intervals to a transmit antenna which then radiates the energy, in the form of a transmit beam, towards the earth's surface. A transmit beam from a radar is sometimes said to "illuminate" an area (e.g., the ground) which reflects (returns) the transmit beam. The reflected beam, sometimes referred to as a ground return, is received at a receive antenna of the radar altimeter. A signal from the receive antenna is processed to determine an altitude of the air vehicle incorporating the radar altimeter.

At very low altitudes (generally defined as from 0 to about 50 feet), for example, during landing and take-off, altimeter performance may be impacted by leakage paths. Specifically, interfering signals may result from a leakage path between the transmit and receive antennas of the radar altimeter. In normal radar altimeter operations, as described above, a transmit antenna transmits a signal towards the ground which reflects the signal. The receive antenna receives the ground reflected signal for processing to determine air vehicle altitude. A leakage path exists when a portion of the transmitted signal is directly received by the receive antenna without having been reflected by the ground.

Other interfering signals are transmit signals reflected from air vehicle surfaces and structures (e.g., wheel well doors and helicopter skids) and transmit signals reflected from other equipment mounted on air vehicle surfaces (e.g., communication antennas, forward looking infrared systems, and cameras). The receive antenna receives these types of signals after antenna leakage but before the ground return pulse returns from the ground.

These unwanted signals may cause the altimeter to: (1) momentarily break track (i.e., the leakage signal periodically inhibits tracking the ground return signal such as during a hover phase cancellation mode), (2) lock on the leakage signal and always indicate a "zero" foot altitude regardless of the altitude of the air vehicle, or (3) oscillate between tracking the leakage signal, which indicates a "zero" foot altitude, and the ground return signal when the altitude is between 20 feet and 80 feet.

In helicopters and other air vehicles with the ability to hover, return signals reflected from various types of terrain such as grass, foliage, or even water can either add to each other or subtract from each other (i.e., phase addition or cancellation). During cancellation, the ground return signal is attenuated and is then more susceptible to interference from a stronger antenna leakage signal. Also, with new air vehicles containing more externally mounted equipment, it is becoming more difficult to find an acceptable antenna mounting arrangement that will maintain antenna leakage signal attenuation.

Solutions to interference signals may include different antenna placement, larger spacing between the antennas, different types of antennas, canting the antennas, or changing the location of other equipment that reflects signals back to the receive antenna. This can be very costly (e.g., changing the mounting or configuration of an air vehicle and potentially a number of the same model vehicles) as well as time consuming. Changing the mounting or configuration of an air vehicle can hold up shipment of new air vehicles or force users to ground air vehicles.

BRIEF DESCRIPTION OF THE INVENTION

In one aspect, a method of radar altimeter operation including a time dependent gain control is provided. The method comprises triggering a Sensitivity Time Control (STC) gain control signal at a pulse repetition frequency (PRF) of a transmit pulse to attenuate interference from at least one of an antenna leakage signal and a signal reflected from equipment. The method also includes shaping the STC gain control signal from no attenuation at a first time, before a transmitter sends the transmit pulse, to a stable maximum attenuation at the time the transmitter sends the transmit pulse, to no attenuation at a second time, after the transmitter sends the transmit pulse. The method also includes matching a bandwidth of an intermediate frequency (IF) amplifier to the pulse width of a transmitted pulse.

In another aspect, a radar altimeter including a time dependent gain control is provided. The radar altimeter comprises a transmit antenna configured to transmit radar signals toward the ground, a receive antenna configured to receive radar signals reflected from the ground, the receive antenna also receiving signals propagated along a leakage path from the transmit antenna, a receiver configured to receive signals from the receive antenna, at least two intermediate frequency (IF) amplifiers configured to receive a Sensitivity Time Control (STC) gain control signal at a pulse repetition frequency (PRF) of the transmitted radar signals to attenuate the leakage signals for a time period before and after the transmitted radar signals are sent, and a band pass filter (BPF) configured to receive a bandwidth control signal from a processor and control the bandwidth of the receiver.

In yet another aspect, a radar receiver unit is provided. The radar receiver unit comprises at least two intermediate frequency (IF) amplifiers, a time shaping gain control generator configured to provide a time dependent gain control signal to at least one of the at least two IF amplifiers, and a band pass filter (BPF) configured to receive a bandwidth control signal from a processor and control the bandwidth of the receiver unit.

DETAILED DESCRIPTION OF THE INVENTION

Methods and systems that reduce interference caused by at least one of an antenna leakage signal and a signal reflected from other equipment mounted on an air vehicle are described herein. Such interference can be reduced by utilizing, for example, a gain control signal that is a function of time, or more specifically, a Sensitivity Time Control (STC) signal.

Figure 1:
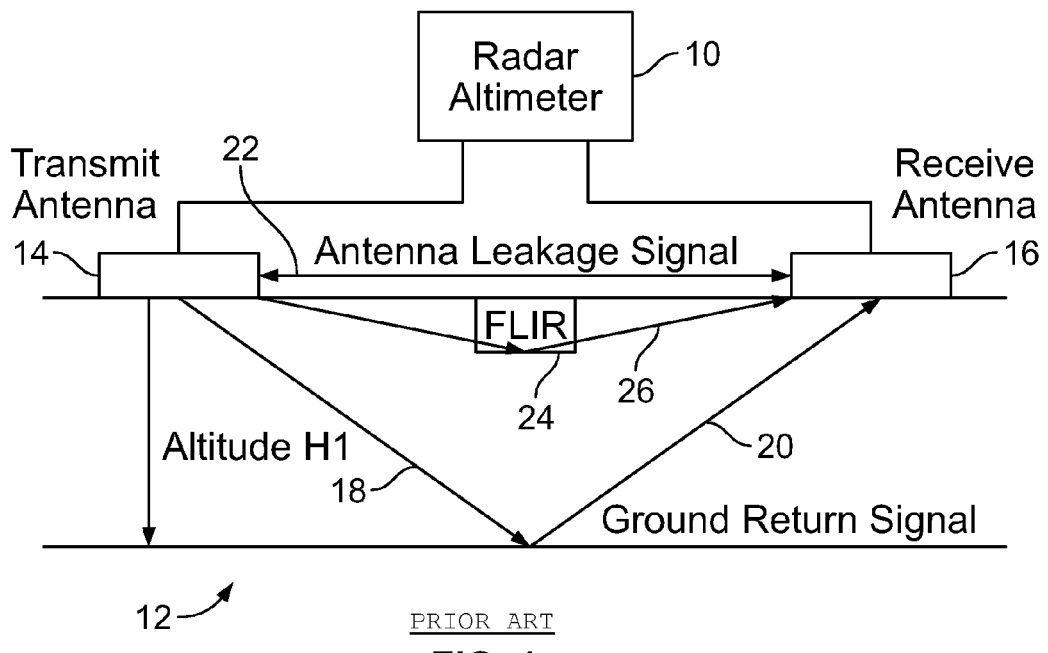
FIG. 1 is a block diagram of a radar altimeter positioned at an altitude above a surface.

Referring now to the drawings, FIG. 1 is a block diagram of a radar altimeter 10 positioned at an altitude of H1 above a surface 12. Radar altimeter 10 is connected to a transmit antenna 14 and a receive antenna 16. Transmit antenna 14 radiates a transmit pulse 18 toward surface 12. A portion of transmit pulse 18 is reflected off of surface 12 and received at receive antenna 16. This reflected signal is sometimes referred to as a ground return signal 20 and is utilized by radar altimeter 10 to calculate an altitude. However, a portion of transmit pulse 18 leaks directly to receive antenna 16. This is referred to as an antenna leakage signal 22. Another portion of transmit pulse 18 is reflected from equipment mounted on the air vehicle surface, in the example of FIG. 1, the equipment is a forward looking infrared system 24. The portion of transmit pulse 18 reflected from forward looking infrared system 24 is a reflected interference signal 26. Antenna leakage signal 22 and reflected interference signal 26 interfere with the ability of radar altimeter 10 to determine an altitude of the air vehicle. At low altitudes it is hardest for radar altimeter 10 to distinguish between interference signals 22 and 26 and ground return signal 20. This is because at low altitudes there is less time between when interference signals 22 and 26 reach receive antenna 16 and when ground return signal 20 reaches receive antenna 16. Interference signals 22 and 26 and ground return signal 20 can be time coincident or in proximity to each other and radar altimeter 10 distinguishes between ground return signal 20 and interference signals 22 and 26. This is typically accomplished utilizing amplitude gain control.

Figure 2:
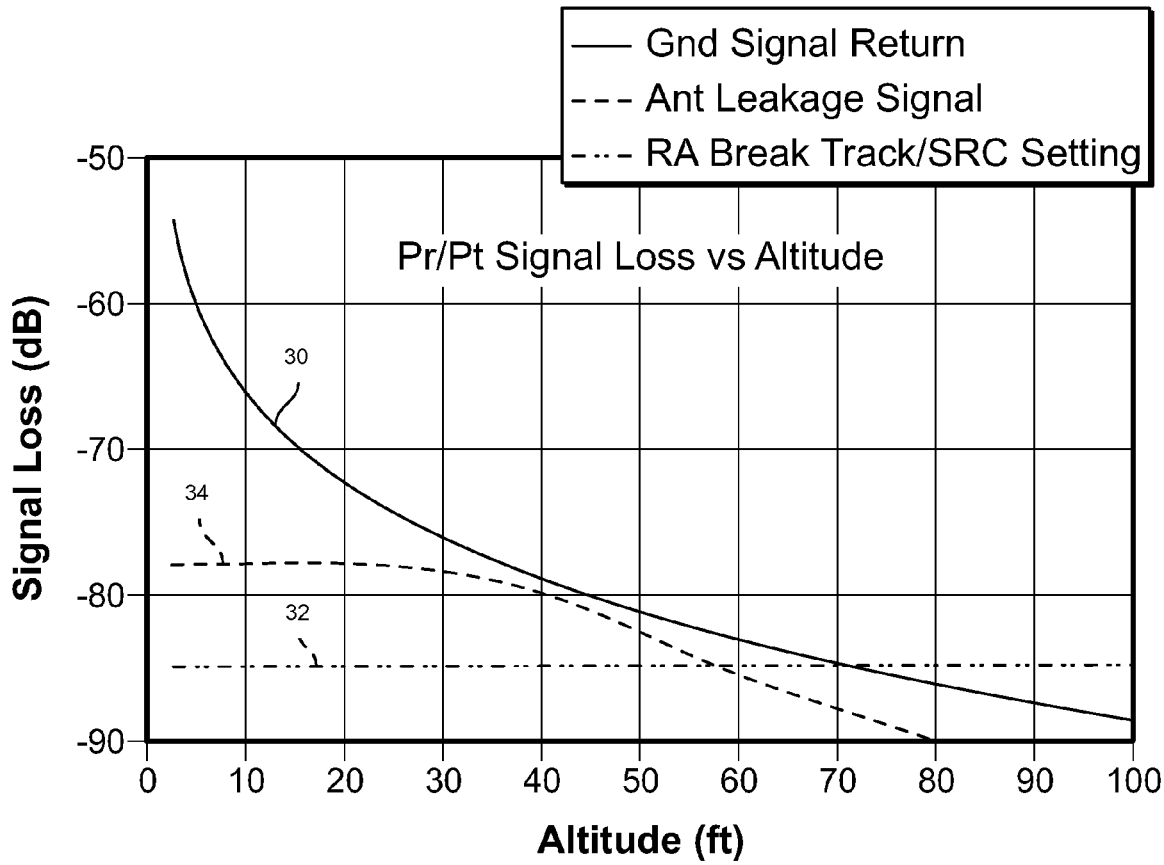
FIG. 2 is a plot comparing the signal strength of a ground return signal, an antenna leakage signal, and a gain control signal as altitude changes.

FIG. 2 is a plot comparing the signal strength of a ground return signal 30, an amplitude gain control signal 32 (e.g., radar altimeter break track or sensitivity range control (SRC)), and an antenna leakage signal 34 as altitude changes. More specifically, FIG. 2 is a plot of the change in signal strength as altitude increases for ground return signal 30, SRC signal 32, and antenna leakage signal 34. Programmed analog automatic gain control signals are known in the prior art and referred to as SRC signals. SRC signals are used to control the gain function of a radar altimeter throughout the low altitude region.

The maximum sensitivity of a radar altimeter is very high. In one numerical example, the maximum sensitivity is −130 dB. At low altitudes the ground return space attenuation is low, which results in a very large ground return signal. Therefore, a gain control must reduce the sensitivity at low altitudes. FIG. 2 illustrates antenna leakage signal 34 attenuated by SRC signal 32 to remain below ground return signal 30 throughout the low altitude region.

The SRC signal is an analog signal generated from an internal range signal (not shown). The internal range signal is an analog signal that varies with altitude. It varies, for example, from 0 to 10 volts representing an altitude from 0 to 5,000 feet. The resulting SRC signal is relatively flat (i.e., constant gain) from, for example, 0 to 30 feet. It controls antenna leakage signal 34 at a fixed level (e.g., −78 dB). For example, at 30 feet, SRC signal 32 allows the altimeter receiver to increase in gain because at high altitude there is more space attenuation of ground return signal 30 and a higher receiver sensitivity is desired. SRC signal 32 becomes non-controlling in this example at approximately 150 feet. The Automatic Gain Control (AGC) (not shown) and Noise Gain Control (NAGC) (not shown) take over and control the receiver gain as a function of the signal strength of ground return signal 30 and system noise.

Figure 3:
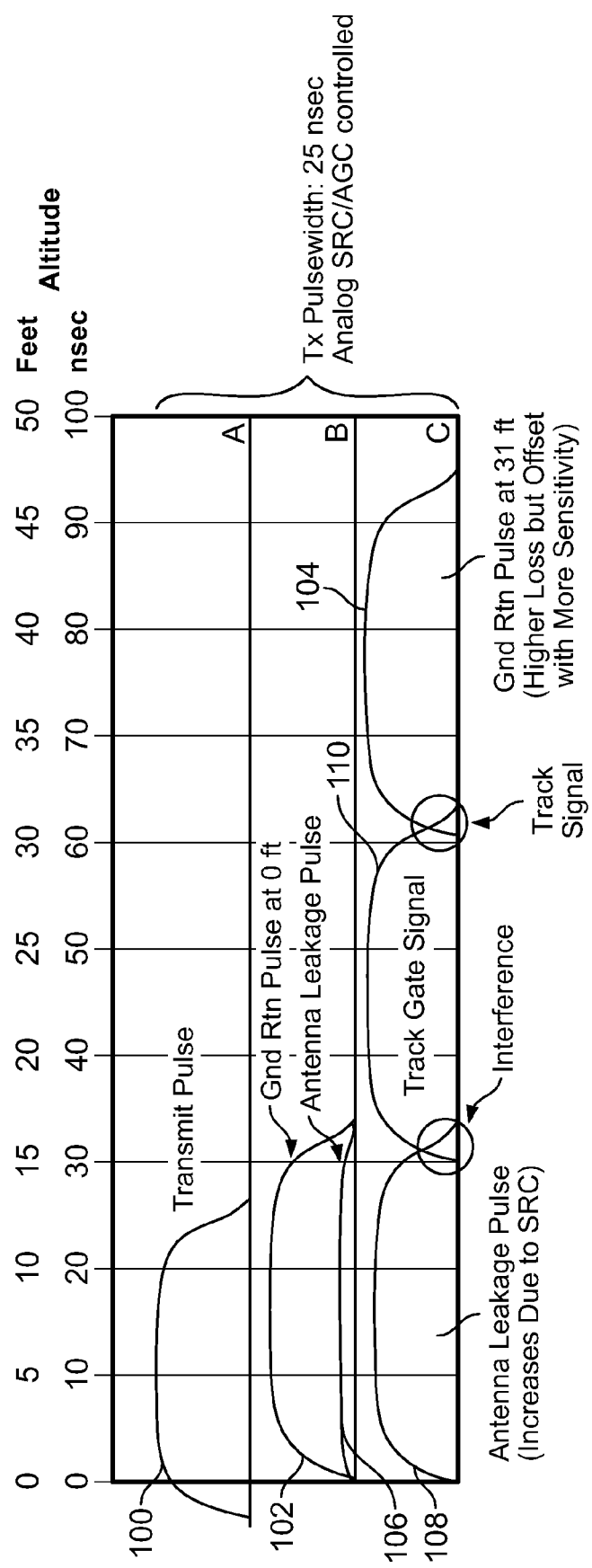
FIG. 3 is a plot illustrating the relationship as a function of time between a transmit pulse, two ground return pulses, two antenna leakage pulses, and a track gate signal.

FIG. 3 is a plot illustrating the relationship over time between a transmit pulse 100, two ground return pulses 102 and 104, two antenna leakage pulses 106 and 108, and a track gate signal 110. FIG. 3 shows transmit pulse 100 with a pulse width of 25 nsecs. Ground return pulse 102 is received by the radar altimeter at 0 nsecs which corresponds to a radar altimeter located at an altitude of 0 feet. Antenna leakage pulse 106 has the same pulse width as transmit pulse 100 and ground return pulse 102. However, the amplitude of antenna leakage pulse 106 is attenuated by an SRC signal (not shown) to be lower than ground return pulse 102. This attenuation enables a radar altimeter receiver to distinguish between ground return pulse 102 and antenna leakage pulse 106.

Ground return pulse 104 is sensed at a radar altimeter receiver approximately 60 nsec after it was sent from a transmitter. This return period corresponds to an altitude of approximately 30 feet. As air vehicle altitude increases, track gate 110 moves out in time. As a result, track gate 110 ignores near in signals such as an antenna leakage signal which does not change with altitude.

However, when the altitude increases, the SRC signal (not shown) no longer attenuates antenna leakage signal 108. As described above, the SRC signal allows the receiver to increase in gain at approximately 30 feet and becomes non-controlling at about 150 feet. As a result, the amplitude of the antenna leakage signal increases. In one specific example, the pulse width of transmit pulse 100 is 25 nsecs and therefore the pulse width of antenna leakage signal 108 is also 25 nsec. If an intermediate frequency (IF) amplifier bandwidth is not matched to this pulse width (i.e., the IF bandwidth is 30 MHz rather than 1/25 nsec or 40 MHz) but is less than what will support the pulse width, the pulse width will stretch in width. In this example, instead of a received antenna leakage signal that has a pulse width of 25 nsec, the signal as viewed at a video amplifier will stretch to 40 nsec. This aggravates the interference problem.

FIG. 3 illustrates the problem a widened antenna leakage pulse width will cause. When at an altitude of 60 feet, the SRC signal allows the entire signal bus to increase which allows the amplitude of antenna leakage signal 108 to increase. Track gate signal 110 may not only overlap ground return signal 104 at the leading edge of ground return signal 104 as is desired, but the leading edge of track gate signal 110 may also overlap the trailing edge of increased antenna leakage signal 108. When this occurs, the internal control loops can not control track gate 110 to be coincident with the leading edge of ground return signal 104 and therefore, break tracks, altitude errors, or oscillation problems occur.

It is desirable to increase the gain at low altitudes quickly to compensate for space losses of the ground return signal. However, as shown in the above example, the rate that the gain can increase, without causing interference, is limited. The rate that the gain can increase is limited because the leakage signal will also increase as the gain is increased, and at a higher altitude, will interfere with the ground return signal.

Figure 4:
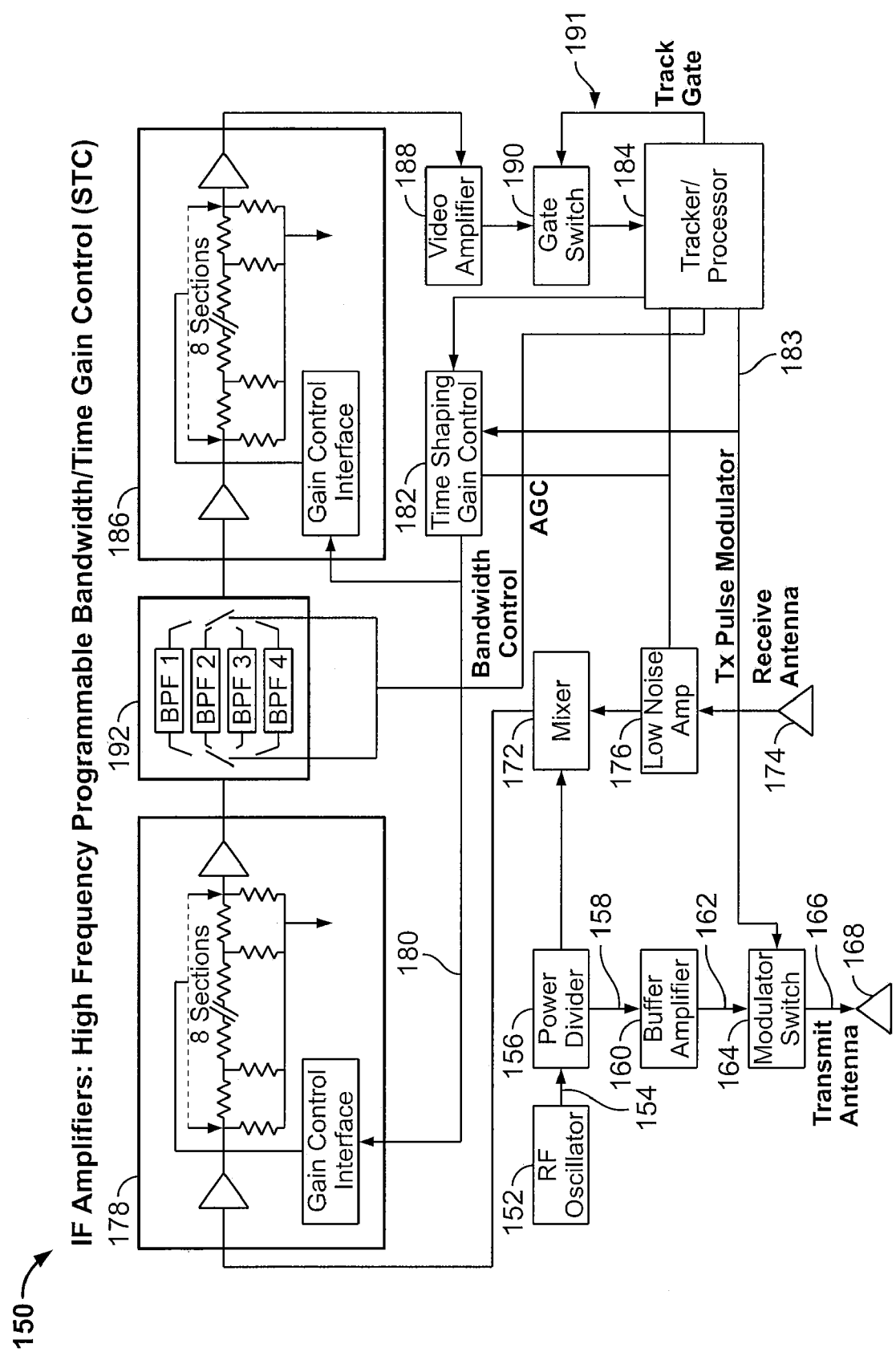
FIG. 4 is a block diagram of a radar altimeter utilizing a time sensitivity gain control signal, referred to as sensitivity time control (STC).

FIG. 4 is a block diagram of a radar altimeter 150 utilizing STC. Radar altimeter 150 includes an RF oscillator 152 that provides a frequency for transmission and for down conversion of radar return pulses. More specifically, and with respect to transmission, RF oscillator 152 provides an RF signal 154 to a power divider 156. Power divider 156 outputs an RF signal 158 to a buffer amplifier 160, which outputs an amplified RF signal 162 for transmission. The amplified RF signal 162 for transmission is provided to a modulator switch 164, which, depending on a state of modulator switch 164, modulates amplified RF signal 162 and routes a modulated output signal 166 to a transmit antenna 168 for transmission as a radar signal towards the ground.

With respect to reception, RF oscillator 152 provides an RF frequency signal to a mixer 172. Transmitted pulses are received at receive antenna 174 and amplified by a low noise amplifier 176. Mixer 172 demodulates the received signals with the frequency from RF oscillator 152 after the received signals are amplified by low noise amplifier 176. The received signals are further amplified by a first intermediate frequency (IF) amplifier 178. First IF amplifier 178 is provided with a gain control signal 180 from a time shaping gain control generator 182. Time shaping gain control generator 182 receives a pulse repetition frequency (PRF) of a transmitter pulse 183 from a processor 184 and provides a time sensitivity gain control signal to first IF amplifier 178 and a second IF amplifier 186 at times corresponding to the PRF and timed with reference to the transmit pulse. Second IF amplifier 186 provides the signal to a video amplifier 188 that amplifies the detected signal from IF amplifier 186. A gate switch 190 receives a track gate signal 191 from processor 184. Gate switch 190 is utilized to "track" a return pulse.

IF amplifiers 178 and 186 are configured to attenuate, as a function of time only, an antenna leakage signal, a reflected interference signal, and a ground return signal.

Radar altimeter 150 also includes a switchable multi-section Band Pass Filter (BPF) 192 that receives a signal from first IF amplifier 178, filters the signal, and provides the signal to second IF amplifier 186. BPF 192 matches the IF bandwidth to the transmit pulse width to prevent the return pulse width from stretching. Transmit pulses typically increase in pulse width at higher altitudes to provide adequate system sensitivity. As a result, to prevent additional interference from leakage signals that stretch in pulse width at low altitudes, the bandwidth of the IF amplifiers is able to support the wider transmit pulse widths utilized at higher altitudes. To achieve this support, the bandwidth of the IF amplifiers is programmed, by processor 184, to match the transmit pulse width. In one numerical example, at a low altitude a transmit pulse is sent with a pulse width of 10 nsec. In this example, the IF amplifier bandwidth should be approximately 100 MHz. In another numerical example, at a higher altitude, a transmit pulse has a pulse width of 100 nsec. In this example, the IF amplifier bandwidth should be approximately 10 MHz.

Figure 5:
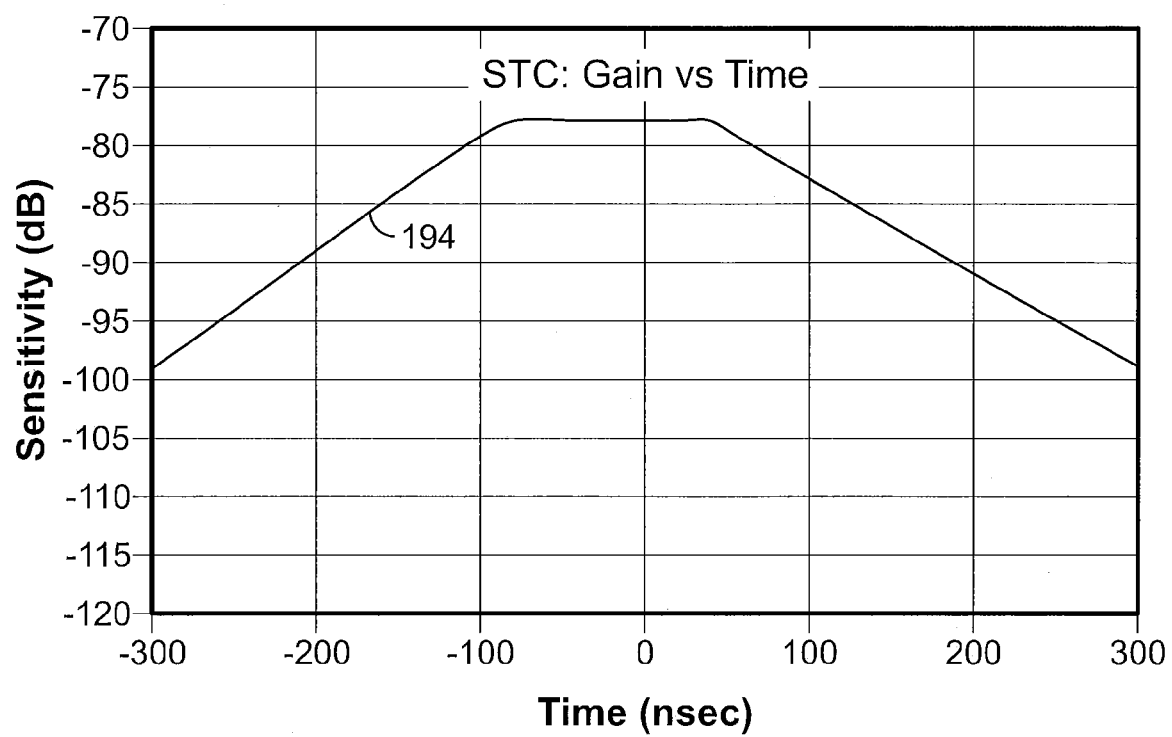
FIG. 5 is a plot of an STC signal.

FIG. 5 is a plot of a time sensitivity gain control signal 194, referred to as Sensitivity Time Control (STC). STC signal 194 is produced by time shaping gain control generator 182 and provided to first IF amplifier 178 and second IF amplifier 186. FIG. 5 shows how STC signal 194 changes over time.

To increase receiver gain at low altitudes quickly while continuing to reduce the interference of the antenna leakage pulse and reflected interference signals, STC signal 194 is implemented. STC signal 194 is triggered each PRF and timed with reference to transmitter pulse 183. In one specific example, STC signal 194 transitions from no control to −78 dB starting approximately 300 nsec before transmitter pulse 183 is sent to modulator switch 164. This time period provides sufficient time to stabilize and provide attenuation to −78 dB, as shown in FIG. 5. STC signal 194 is shaped to increase the gain as a function of time (i.e., as opposed to the SRC in current radar altimeters which is shaped to increase the gain as a function of an analog signal that is a function of altitude.)

Figure 6:
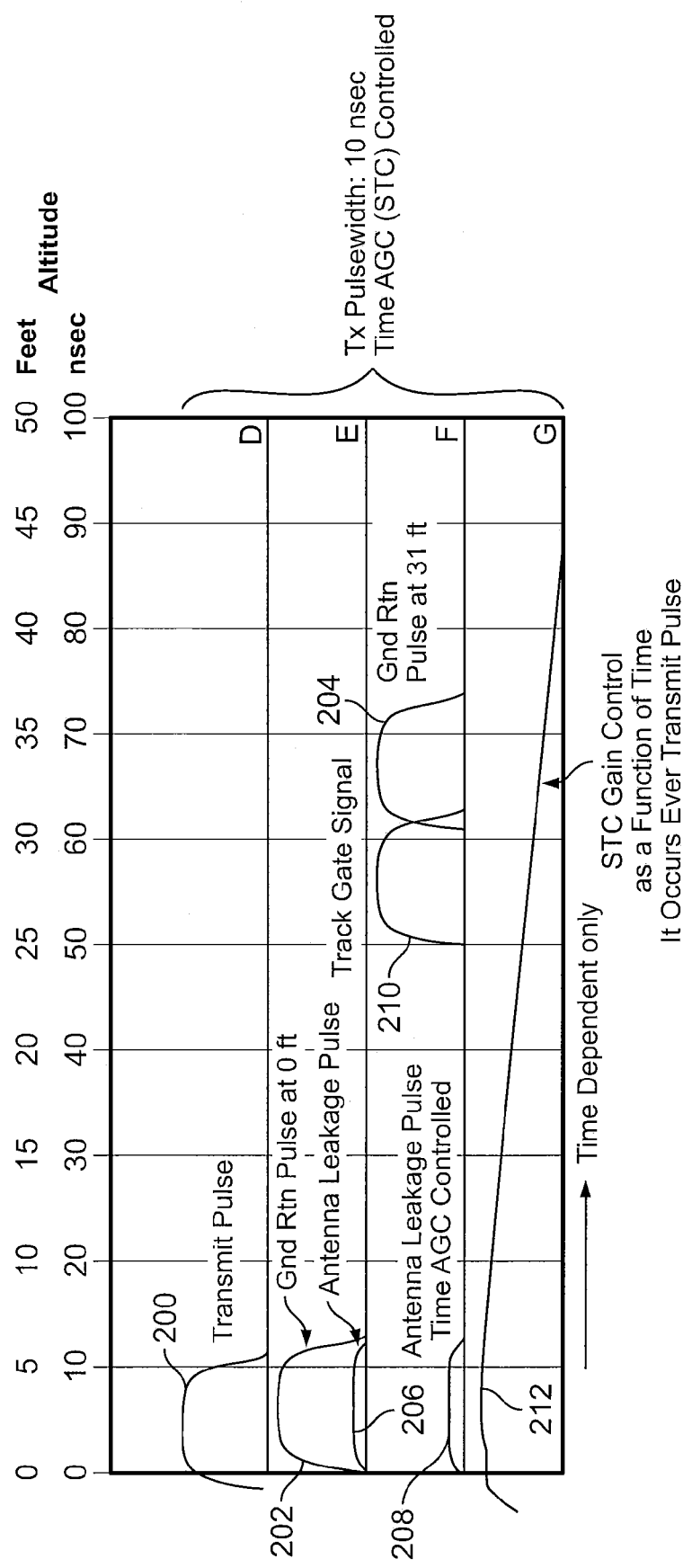
FIG. 6 is a plot illustrating the relationship over time between a transmit pulse, two ground return pulses, two antenna leakage pulses, a track gate signal, and a sensitivity time control (STC) signal.

FIG. 6 is a plot illustrating the relationship over time between a transmit pulse 200, two ground return pulses 202 and 204, two antenna leakage pulses 206 and 208, a track gate signal 210, and an STC signal 212. STC signal 212 maintains attenuation of antenna leakage pulses 206 and 208 at all times and will increase the gain for a ground return signal at higher altitudes as shown. Unlike other radar applications where distant objects are what is of interest and sensitivity is kept low until returns from close-in clutter have been received, in a radar altimeter at a low altitude, it is not only distant objects that are of interest. The vehicle's altitude is of interest at low altitudes. STC signal 212 increases the gain of the receiver after the transmit pulse is emitted, allowing return pulses to be identified even at low altitudes.

It is also desirable at low altitudes to employ narrow transmit pulses, for example, 10 nsec. This will allow STC signal 212 to increase gain rapidly without antenna leakage pulses 206 and 208 interfering with tracking gate 210.

The methods and apparatus described above facilitate attenuation of antenna leakage signals and other reflected signal interference to prevent momentary breaks in tracking, lockup on the leakage signal, oscillation between the tracking and leakage signals, and inaccuracies due to gate slide or hover fading. This is achieved by attenuating the antenna leakage signals and other reflected signal interference with an STC signal every PRF. So as not to interfere with the tracking gate or ground return pulse, the STC signal is shaped to increase the system gain as a function of time and improve the amplitude of ground return signals at altitudes greater than 10 feet. This mechanization can provide excellent hover performance when narrow transmit pulses are utilized by spreading the spectrum due to narrow transmit pulses that minimize signal cancellation. This mechanization allows the system to operate properly even in air vehicles with marginal antenna installations, providing air vehicle manufacturers and users more latitude in locating the antennas as well as other equipment on the surface of the vehicle. This mechanization also provides significant cost and schedule savings along with customer satisfaction, and eliminates the potential for costly troubleshooting and air vehicle changes.

While the invention has been described in terms of various specific embodiments, those skilled in the art will recognize that the invention can be practiced with modification within the spirit and scope of the claims.

What is claimed is:

1. A method of radar altimeter operation including a time dependent gain control, said method comprising:
    triggering a Sensitivity Time Control (STC) gain control signal at a pulse repetition frequency (PRF) of a transmit pulse to attenuate interference from at least one of an antenna leakage signal and a signal reflected from equipment;
    shaping the STC gain control signal for a pulse width of the transmit pulse from no attenuation at a first time, before a transmitter sends the transmit pulse, to a stable maximum attenuation at the time the transmitter sends the transmit pulse, to no attenuation at a second time, after the transmitter sends the transmit pulse; and
    in response to a change in altitude, matching a bandwidth of an intermediate frequency (IF) amplifier to the pulse width of a transmitted pulse.

2. A method of radar altimeter operation of claim 1 wherein triggering an STC gain control signal at a PRF to attenuate interference from at least one of an antenna leakage signal and a signal reflected from equipment comprises programming a processor to provide the PRF of the transmit pulse to a STC gain control generator.

3. A method of radar altimeter operation of claim 2 wherein programming a processor to provide the PRF of the transmit pulse to the STC gain control generator further comprises configuring the STC gain control generator to provide the STC gain control signal to at least one IF amplifier.

4. A method of radar altimeter operation of claim 1 wherein matching a bandwidth of an IF amplifier to the pulse width of a transmitted pulse comprises programming a processor to match the bandwidth of the IF amplifier to the pulse width of the transmit pulse.

5. A method of radar altimeter operation of claim 1 wherein matching a bandwidth of an IF amplifier to the pulse width of a transmit pulse further comprises configuring a processor to vary the pulse width of a transmit pulse as altitude varies.

6. A radar altimeter including a time dependent gain control, said radar altimeter comprising:
- a transmit antenna configured to transmit radar signals toward the ground;
- a receive antenna configured to receive radar signals reflected from the ground, said receive antenna also receiving signals propagated along a leakage path from said transmit antenna; and
- a receiver configured to receive signals from said receive antenna and a Sensitivity Time Control (STC) gain control signal at a pulse repetition frequency (PRF) of the transmitted radar signals to attenuate the leakage signals for a time period before and after the transmitted radar signals are sent, said receiver further comprising a band pass filter (BPF) configured to receive a bandwidth control signal from a processor and match the bandwidth of said receiver to a pulse width of the transmitted radar signals such that the bandwidth of said receiver supports a pulse width of the transmitted radar signals in response to changes in altitude.

7. A radar altimeter according to claim 6 wherein said receiver comprises at least two intermediate frequency (IF) amplifiers configured to receive the STC gain control signal at the PRF of the transmitted radar signals to attenuate the leakage signals for a time period before and after the transmitted radar signals are sent.

8. A radar altimeter according to claim 7 wherein said receiver comprises an STC gain control generator configured to provide the STC gain control signal to at least one of said at least two IF amplifiers.

9. A radar altimeter according to claim 6 wherein said receiver comprises a processor programmed to provide the PRF and the transmitted radar signals to said STC gain control generator.

10. A radar altimeter according to claim 6 wherein said receiver comprises a processor configured to provide a bandwidth control signal to said BPF to match the bandwidth of said receiver to the pulse width of the transmitted radar signals such that the bandwidth of said receiver supports the pulse width of the transmitted radar signals.

11. A radar altimeter according to claim 6 wherein said receiver comprises a processor configured to vary the pulse width of the transmitted radar signals as altitude changes.

12. A radar receiver unit comprising:
- at least two intermediate frequency (IF) amplifiers;
- a time shaping gain control generator configured to provide a time dependent gain control signal to at least one of said at least two IF amplifiers, the at least two IF amplifiers configured to receive the time dependent gain control signal at a pulse repetition frequency (PRF) of a transmitted radar signal to attenuate a leakage signal for a time period before and after the transmitted radar signal is sent; and
- a band pass filter (BPF) configured to receive a bandwidth control signal from a processor and match the bandwidth of said receiver unit to a pulse width of the transmitted radar signals such that the bandwidth of said receiver supports the pulse width of the transmitted radar signals in response to changes in altitude.

13. A radar receiver unit according to claim 12 wherein said receiver unit comprises a processor programmed to provide a PRF and of the transmitted radar signals to said time shaping gain control generator.

14. A radar receiver unit according to claim 12 wherein said receiver unit comprises a processor configured to provide a bandwidth control signal to said BPF to match the bandwidth of said receiver unit to the pulse width of the transmitted radar signals such that the bandwidth of said receiver unit supports the pulse width of the transmitted radar signals.

15. A radar receiver unit according to claim 12 wherein said receiver unit comprises a processor configured to vary the pulse width of the transmitted radar signals.

* * * * *